United States Patent
Duh

[11] Patent Number: 5,533,344
[45] Date of Patent: Jul. 9, 1996

[54] METHOD FOR RAPIDLY SOLIDIFYING WATER IN A CONTAINER

[76] Inventor: Shi-Chin Duh, 1F, No. 28, Lane 147, Sec. 1, Chi-Lund Rd., Taipei City, Taiwan

[21] Appl. No.: 427,435

[22] Filed: Apr. 24, 1995

[51] Int. Cl.⁶ ........................ F25C 1/00
[52] U.S. Cl. ........................ 62/66; 62/340
[58] Field of Search ............... 62/66, 340, 1, 62/351, 353

[56] References Cited

U.S. PATENT DOCUMENTS

| | | | |
|---|---|---|---|
| 2,334,941 | 11/1943 | Linden | 62/1 |
| 3,321,932 | 5/1967 | Orphey, Jr. | 62/340 |
| 4,062,201 | 12/1977 | Schumacher et al. | 62/353 |
| 4,856,196 | 8/1989 | Shu | 62/430 |

Primary Examiner—William E. Tapolcai
Attorney, Agent, or Firm—Reinhart, Boerner, Van Deuren, Norris & Rieselbach

[57] ABSTRACT

A method for rapidly solidifying water in a container includes the steps of disposing a predetermined amount of sand in a container which contains water and solidifying the water in the container.

3 Claims, 4 Drawing Sheets

5,533,344

METHOD FOR RAPIDLY SOLIDIFYING WATER IN A CONTAINER

BACKGROUND OF THE INVENTION

1. Field of the Invention

This invention relates to a method for rapidly solidifying water in a container, and more particularly to a method for rapidly solidifying water in a container by means of sand, which is easily available and obtained at an extremely low cost.

2. Description of the Related Art

It is well known that water can rapidly solidify in the freezing process by the use of a core. The core may be in many forms, for example, U. S. Pat. No. 4,856,296, filed on Jul. 12, 1988, and issued to Chi-Yao Shu, disclosed a container for ice and water in an ice bunker of an air cooling system in which a central stem is secured therein. The central stem has a plurality of branches and serves as a core in order to raise the temperature at which the water begins to solidify. The Shu core and all other known relevant prior art cores are man-made or processed products which increases the cost of the core significantly owing to the increased labor and material costs.

SUMMARY OF THE INVENTION

It is therefore a main object of this invention to provide a method for rapidly solidifying water in a container by providing a core which can be obtained at an extremely low cost.

Accordingly, the method for rapidly solidifying water in a container comprises the steps of:

disposing a predetermined amount of sand in the container which contains water; and solidifying the water in the container.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

Figure 1:
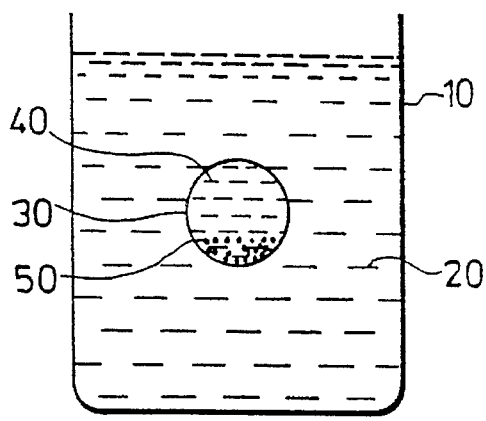
FIG. 1 is a schematic view illustrating ice being formed in an ice container which contains sand and which is dipped in an ice bunker of an ice storage system in accordance with the method of this invention.

FIG. 1 shows ice being formed in an ice container 30 dipped in the brine water solution 20 of an ice bunker 10 of an ice storage system in accordance with a method for rapidly solidifying water in the ice container 30 of this invention. The ice container 30 is a PET bottle with bellows-like portions (not shown) which expand in the icing process in order to prevent the ice container 30 from being damaged or deformed. The brine water solution 20 is a 30 wt% glycol aqueous solution. The ice bunker 10 has a thermostat and is capable of maintaining the temperature of the brine water solution at a constant temperature. The ice container 30 contains 1 liter of water 40, and 60 grams of sand 50. The sand 50 is natural sand heated to a high temperature and then washed before being disposed in the ice container 30.

Figure 2:
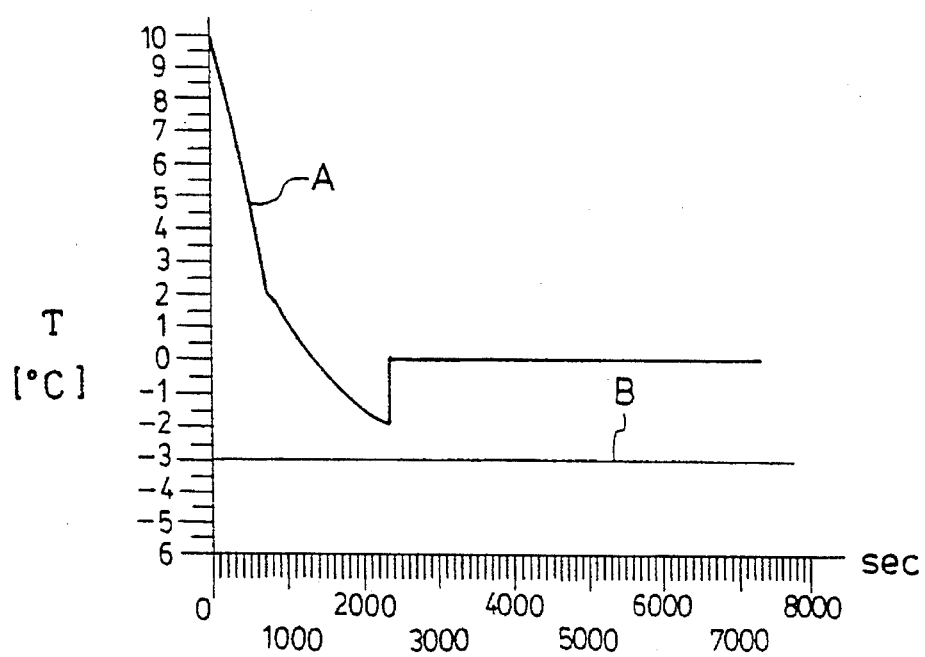
FIG. 2 is a graph illustrating the temperature change of the interior and exterior of the ice container in the ice bunker of the ice storage system in accordance with the method of this invention.

FIG. 2 is a graph illustrating the temperature change of the interior and exterior of the ice container 30 in the ice bunker 10 of the ice storage system in accordance with a test conducted by the inventor. The X-axis of the graph indicates the time of the icing operation, while the Y-axis of the graph indicates the temperature of water, ice 40, and the brine water solution 20. Curve A indicates the temperature change of the water or ice in the ice container 30 in accordance with this invention. Curve B indicates the temperature of the brine water solution 20 in the ice bunker 10 in accordance with this invention. As indicated in curve A of FIG. 2, it takes about 40 minutes for the water 40 in the ice container 30 to be cooled to $-2.5°$ C. by the brine water solution 20. The ice cores then begin to form and the water 40 in the ice container 30 begins to solidify. Subsequently, the water 40 continues to solidify at $0°$ C. while the temperature of the brine water solution 20 is maintained at $-3°$ C.

Figure 3:
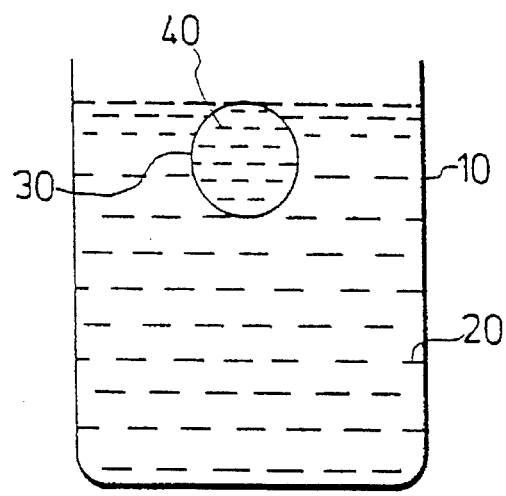
FIG. 3 is a schematic view illustrating an ice container which is dipped in an ice bunker of an ice storage system in accordance with prior art.
Figure 4:
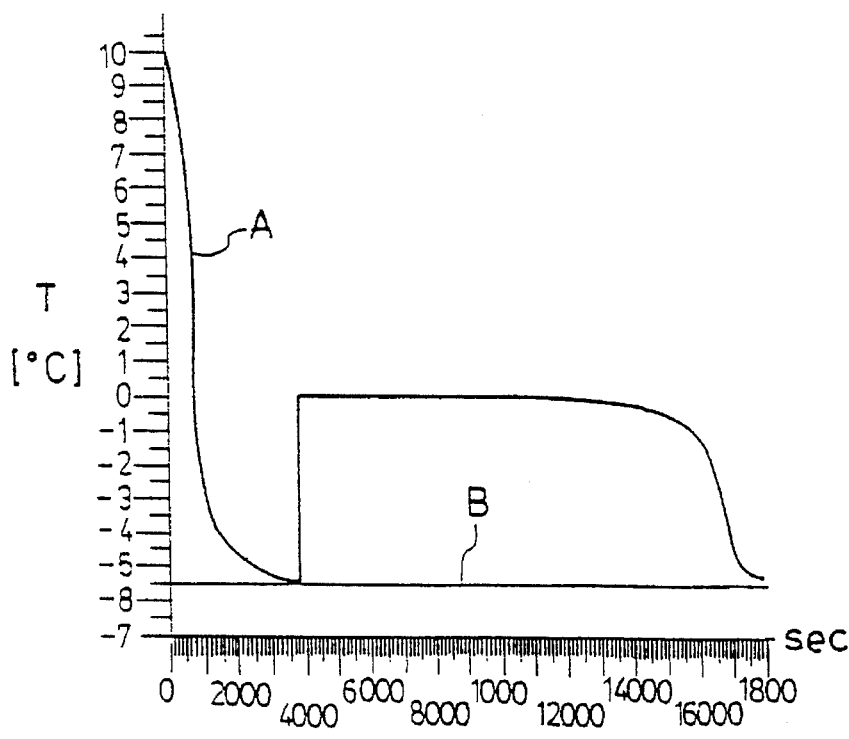
FIG. 4 is a graph illustrating the temperature change of the interior and exterior of the ice container in the ice bunker of the ice storage system in accordance with prior art.

Referring to FIG. 3, for comparison, a test of the temperature change of the interior and exterior of a water container 30 in the ice bunker 10 of an ice storage system in accordance with prior art is also conducted by the inventor. In this test, the conditions are similar to the above-mentioned test of this invention, except that the ice container 30 contains no sand 50, and the temperature of the brine water solution is maintained at $-4°$ C. In FIG. 4, Curve C indicates the temperature change of the water or ice 40 in the ice container 30 in accordance with the prior art. Curve B indicates the same as that of FIG. 2. As indicated in curve B of FIG. 4, it takes about 60 minutes for the water 40 in the ice container 30 to be cooled to $-5.5°$ C. by the brine water solution 20. The ice cores then begins to form and the water 40 in the ice container 30 begins to solidify. Subsequently, the water 40 continues to solidify at $0°$ C. while the temperature of the brine water solution 20 is maintained at $-5.5°$ C.

It can be seen from FIGS. 2 and 4, by comparison, the method for rapidly solidify water in a container 30 has the following advantages:

(1) The time required to form the ice cores, i.e., to solidify the water 40 in the ice container 30 in which sand 50 is disposed according to the method of this invention is greatly reduced. Therefore, the operating power can be significantly lowered.

(2) The temperature of the brine water solution can be raised greatly from about −6° C. to about −3° C. This saves about 12% of the electric power for solidifying the water 40 in the ice container 30.

Since the operating time and power are reduced significantly, the operating cost may be greatly lowered.

In addition, the sand 50 in the ice container 30 increases the total weight of the ice container 30. Therefore, the sand 50 can serve as a ballast to allow the ice container 30 to always be dipped in the brine water solution 20 in order to achieve good heat-transfer efficiency.

Because sand 50 can be easily obtained from a natural source at a relatively low cost, the cost of solidifying the water 40 in the ice container 30 of an ice storage system can be further reduced.

Figure 5:
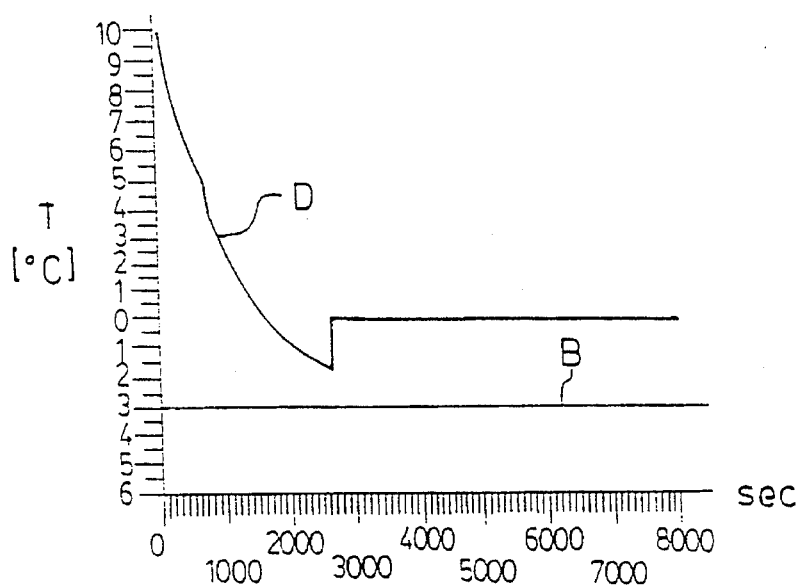
FIG. 5 is a graph similar to FIG. 2, in which the sands are not cleaned before being disposed in the ice container and the brine water solution is slightly turbid.
Figure 6:
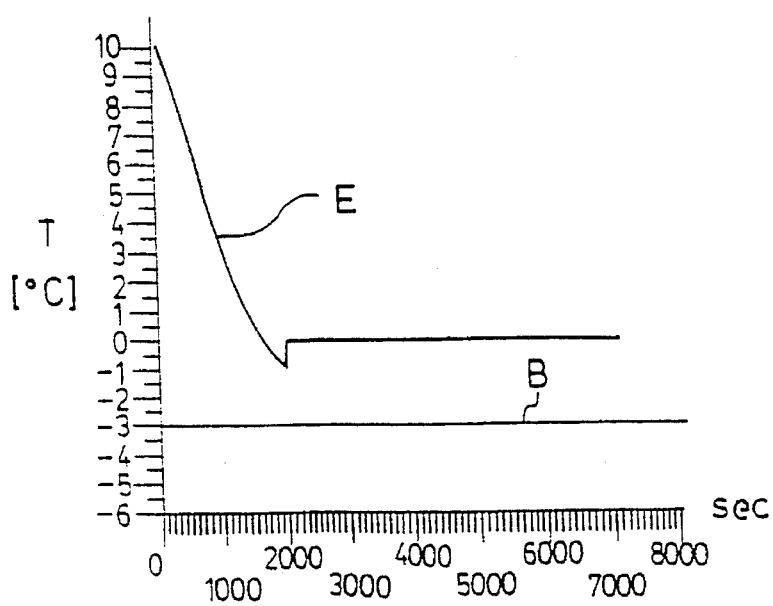
FIG. 6 is a graph similar to FIG. 2, in which the sands are slightly oxided before being disposed in the ice container and the brine water solution is slightly turbid.

FIGS. 5 and 6 show two further tests conducted by the inventor which are similar to that of FIG. 2. More specifically, in FIG. 5, the sands 50 are not washed before being disposed in the ice container 30 and the brine water solution 20 is slightly turbid, and in FIG. 6, the sands 50 are slightly oxided before being disposed in the ice container 30 and the brine water solution 20 is slightly turbid. Curves D and E indicate the temperature change of the water or ice in the ice container 30 in accordance with this invention. Curve B indicates the temperature of the brine water solution 20 in the ice bunker 10 in accordance with this invention. It can be seen from FIGS. 5 and 6 that it takes respectively about 45 and 35 minutes for the water 40 in the ice container 30 to be cooled to −2° C. and −1° C. by the brine water solution 20. Therefore, the conclusion is that regardless whether the sands 50 are unwashed or oxided, the above mentioned advantages can be obtained when the sands 50 are used as a core in accordance with the method of this invention.

Figure 7:
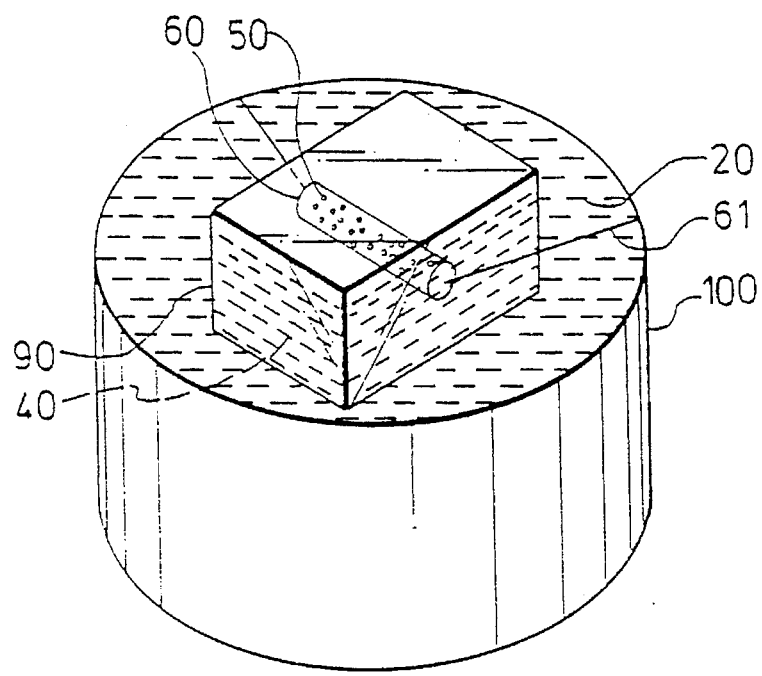
FIG. 7 is a schematic view illustrating a block of ice being formed in an ice can in which a metal net bag with sand is disposed in accordance with the method of this invention.

FIG. 7 shows a block of ice 90 being formed in an ice can 100 in accordance with the method of this invention. In this case, the sand 50 is enclosed in a cylindrical, metal net bag 60 in order to prevent the sand 50 from sinking to the bottom of the ice can 100 or dispersing in the water 40 which is to be solidified into ice 90. The metal net bag 60 is supported in the ice can 100 in any position by means of any suitable fixing members, such as wires 61.

Figure 8:
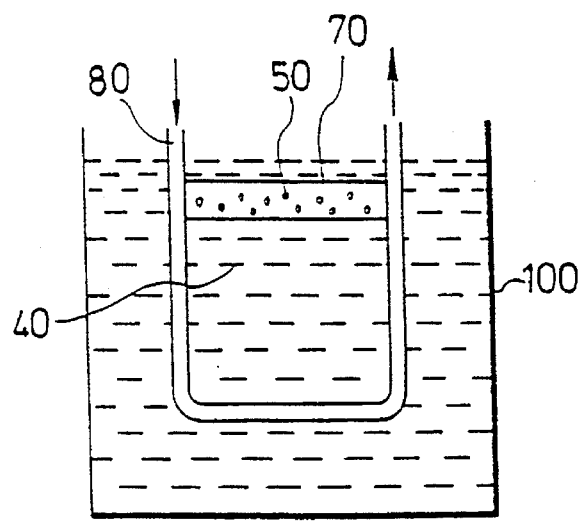
FIG. 8 is a schematic view illustrating ice being formed in coils in which a plastic net bag with sand is disposed in accordance with the method of this invention.

FIG. 8 shows ice being formed in coils 80 in which a cylindrical plastic net bag 70 and sand 50 are disposed in accordance with the method of this invention. The two ends of the cylindrical, plastic net bag 70 are supported between the coils 80 near the top of the ice can 100 in order to obtain a better heat transfer effect.

With this invention thus explained, it is apparent that numerous modifications and variations can be made without departing from the scope and spirit of this invention. It is therefore intended that this invention be limited only as indicated in the appended claims.

I claim:

1. A method for rapidly solidifying water in a container, comprising the steps of:

disposing a predetermined amount of sand in said container which contains water; and solidifying said water in said container.

2. A method for rapidly solidifying water in a container as claimed in claim 1, further comprising the steps of disposing said sand in a metal net bag and positioning said metal net bag in said container to allow said sand to be dipped in said water.

3. A method for rapidly solidifying water in a container as claimed in claim 1, further comprising the steps of disposing said sand in a plastic net bag and positioning said plastic net bag in said container to allow said sand to be dipped in said water.

* * * * *